Oct. 17, 1967 M. J. H. STAAR 3,347,482

TAPE RECORDER CONTROL DEVICE

Filed April 28, 1965 17 Sheets-Sheet 1

Oct. 17, 1967 M. J. H. STAAR 3,347,482

TAPE RECORDER CONTROL DEVICE

Filed April 28, 1965 17 Sheets-Sheet 2

Oct. 17, 1967 M. J. H. STAAR 3,347,482

TAPE RECORDER CONTROL DEVICE

Filed April 28, 1965 17 Sheets-Sheet 3

TAPE RECORDER CONTROL DEVICE

Filed April 28, 1965

17 Sheets-Sheet 6

Oct. 17, 1967 M. J. H. STAAR 3,347,482

TAPE RECORDER CONTROL DEVICE

Filed April 28, 1965 17 Sheets-Sheet 8

Oct. 17, 1967 M. J. H. STAAR 3,347,482

TAPE RECORDER CONTROL DEVICE

Filed April 28, 1965 17 Sheets-Sheet 9

Oct. 17, 1967 M. J. H. STAAR 3,347,482

TAPE RECORDER CONTROL DEVICE

Filed April 28, 1965

17 Sheets-Sheet 15

United States Patent Office 3,347,482
Patented Oct. 17, 1967

3,347,482

TAPE RECORDER CONTROL DEVICE

Marcel Jules Helene Staar, Rhode-Saint-Genese, Belgium, assignor to Usines Gustave Staar S.A., Brussels, Belgium Filed Apr. 28, 1965, Ser. No. 451,461
Claims priority, application Belgium, Apr. 29, 1964, 647,272
19 Claims. (Cl. 242—55.12)

This invention relates to devices for unwinding and rewinding a sound-recording tape of predetermined length from and into a moving cassette for recording or reproduction, the tape being in substantially the same position in the cassette at the end of operation as at the beginning thereof, recording or reproducing being effected half in the direction of tape unwinding and half in the rewinding direction.

A device of the kind referred to forms the subject matter of applicant's application S.N. 321,013 filed Nov. 4, 1963.

It is an object of the invention to provide an improved device one of whose advantages over the prior art device just mentioned is to obviate the need to provide the tape with indicating marks associated with starting, end of recording and reversal of movement of the tape.

Another object of the invention is so to devise matters that the positioning of the tape and maintaining it in co-operation with the tape-driving, recording and reproducing elements, and the cancellation of such co-operation, are effected solely by means of the mechanical energy expended or stored during the sliding of the cassette into its operative position.

Another object of the invention is to make it possible to use tapes which can be recorded over their entire length.

To this end, in the device according to the invention, as well as the tape-driving, recording and reproducing means, elements for detecting the presence of the tape are disposed between, on the one hand, the position taken up by the moving cassette in the operative position and, on the other hand, the stationary magazine where the tape is stored during operations, such elements controlling the reversal of the direction of tape movement or the stoppage thereof and, where applicable, other operations related to the automatic features of the device. In a practical form of the invention, there are provided for driving the sound tape a driving roller and, disposed one each on either side thereof, a reproduce or record head and detector elements basically formed by photoelectric cells co-operating with lamps respectively so disposed that a cell can be energised only if, the corresponding lamp being lit, the sound tape does not form an obstacle between such lamp and such cell.

As a rule, the tape-driving roller is disposed between two playback or recording heads whose playback faces are aligned in the same plane as one another, and the detector elements can be respectively disposed between the tape-driving roller and the head near the stationary magazine, and between the other head and the cassette when the same is in the operative position.

For a better understanding of the invention, an embodiment thereof will be described hereinafter by way of non-limitative examples with reference to the accompanying drawings, wherein.

Figure 1:
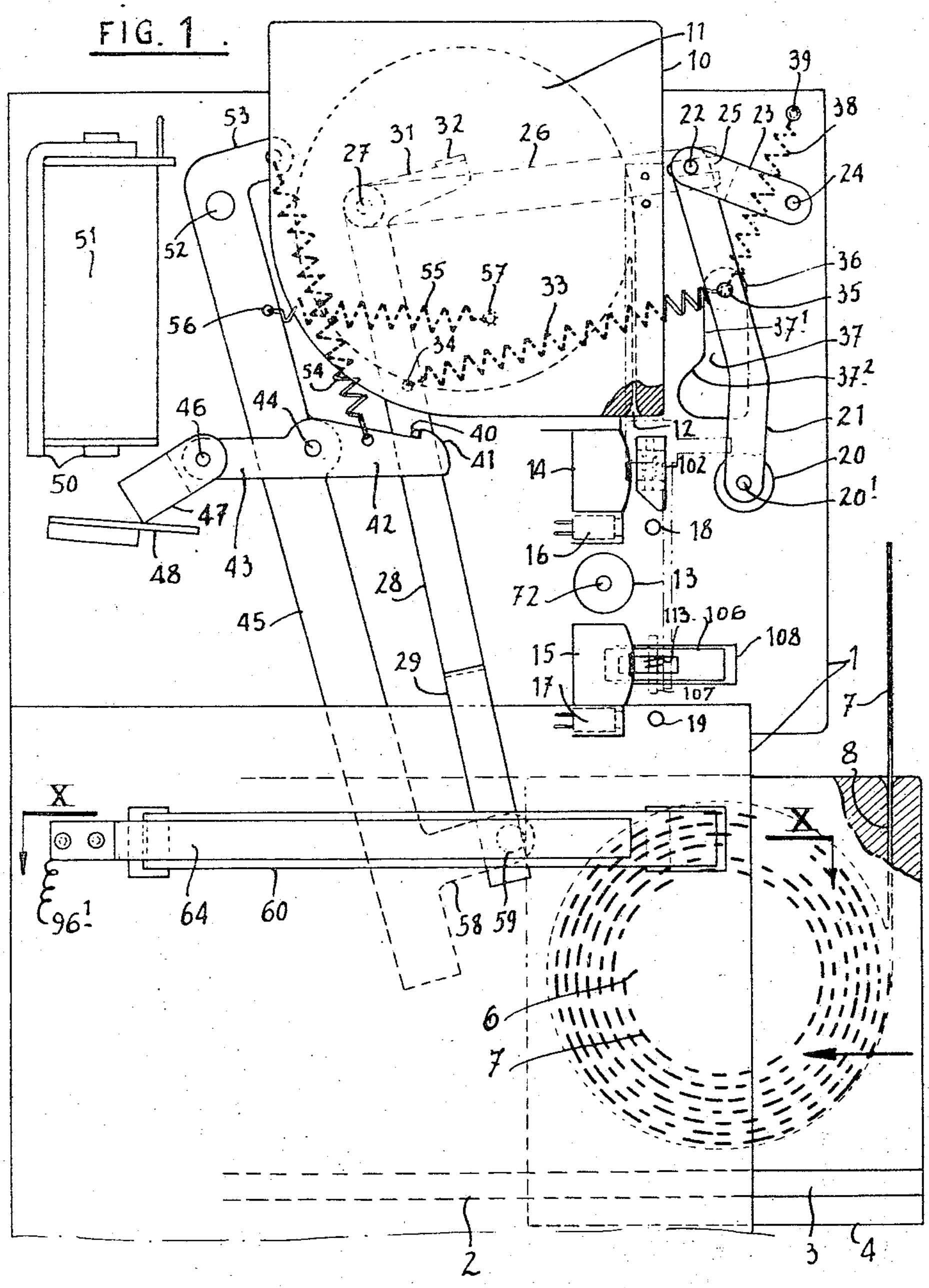
FIGS. 1–6 are plan views showing the complete device with the operative elements in various positions associated with movement of the tape in both directions.

As the drawings show, the device comprises a frame 1 having at its bottom part a horizontal tongue 2 (FIGS. 1 and 8) slidably engageable by a transverse groove 3 in a cassette 4 formed with an interior circular space 6 bounded by an inner periphery of the cassette such that a tape 7 of adequate strength can be wound on itself without any former when introduced, just by the force applied by external elements to be described hereinafter, through a passage 8 through which the tape enters and leaves the cassette and which connects the outer edge of the cassette to the interior space 6, at a place where the passage 8 is at a tangent to the periphery of the interior space 6. The cassette includes a loop-shaped resilient strip to enable the first turns of tape to be wound to a diameter less than the diameter of the walls bounding the interior 6, in the manner disclosed by applicant's application No. 321,013, filed Nov. 4, 1963.

Figure 2:
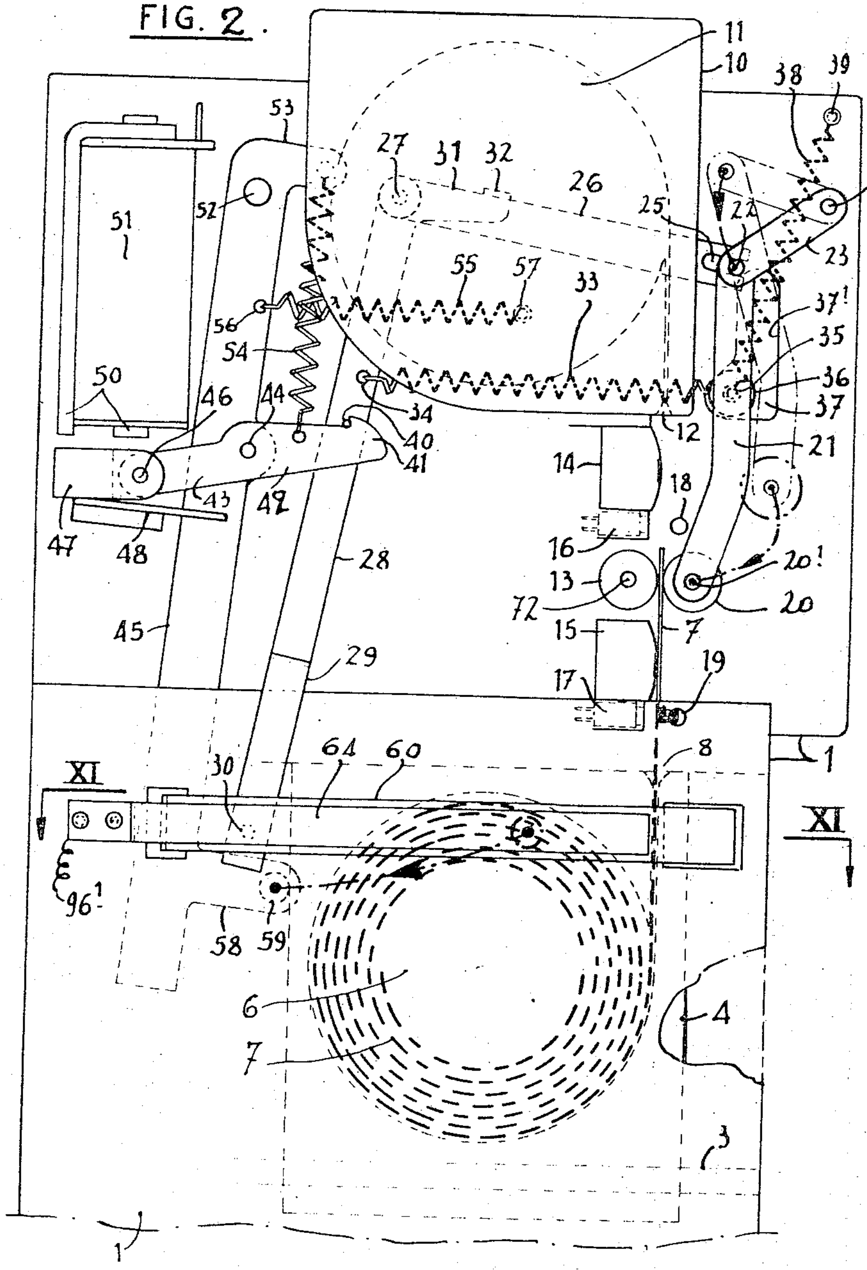
Figure 3:
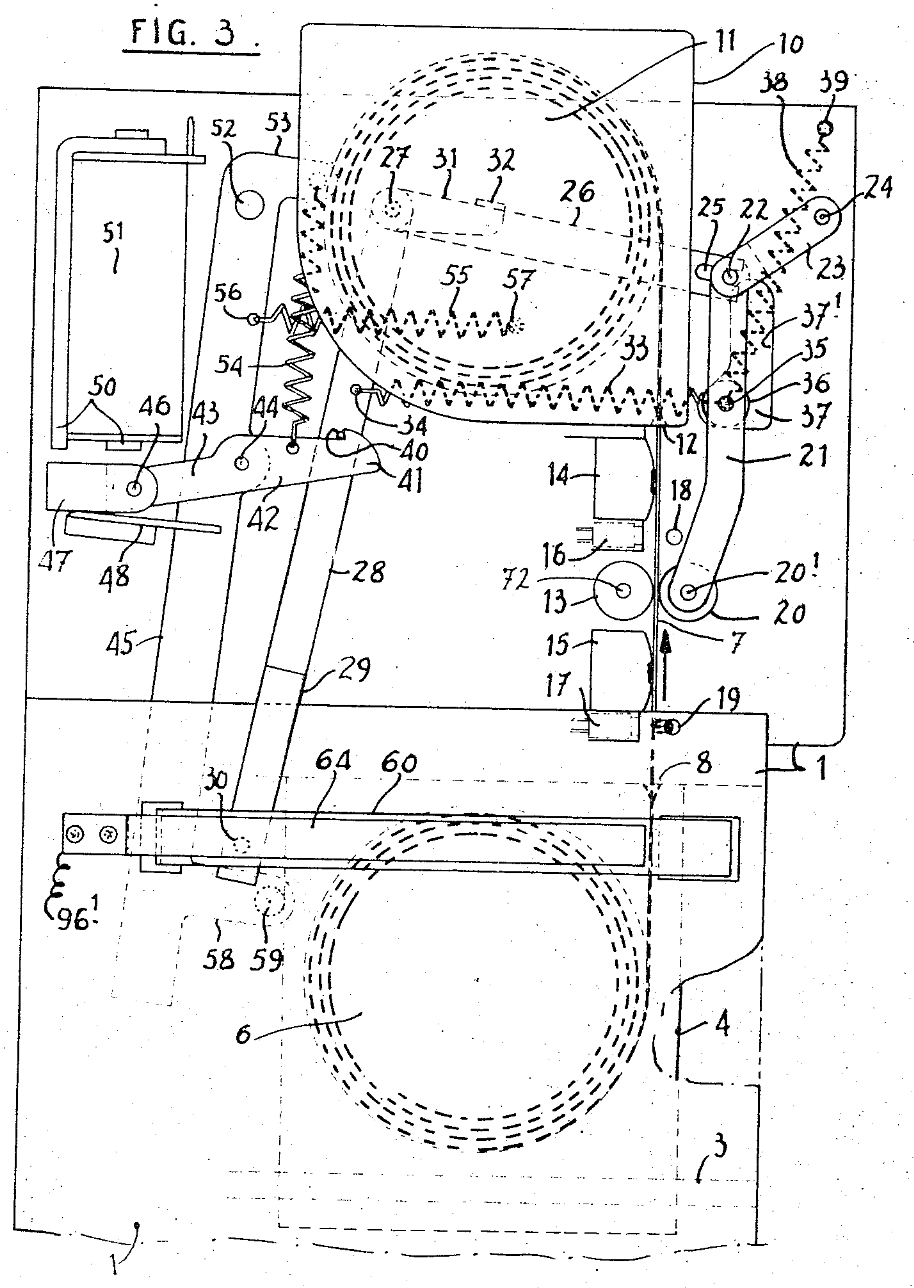
Figure 8:
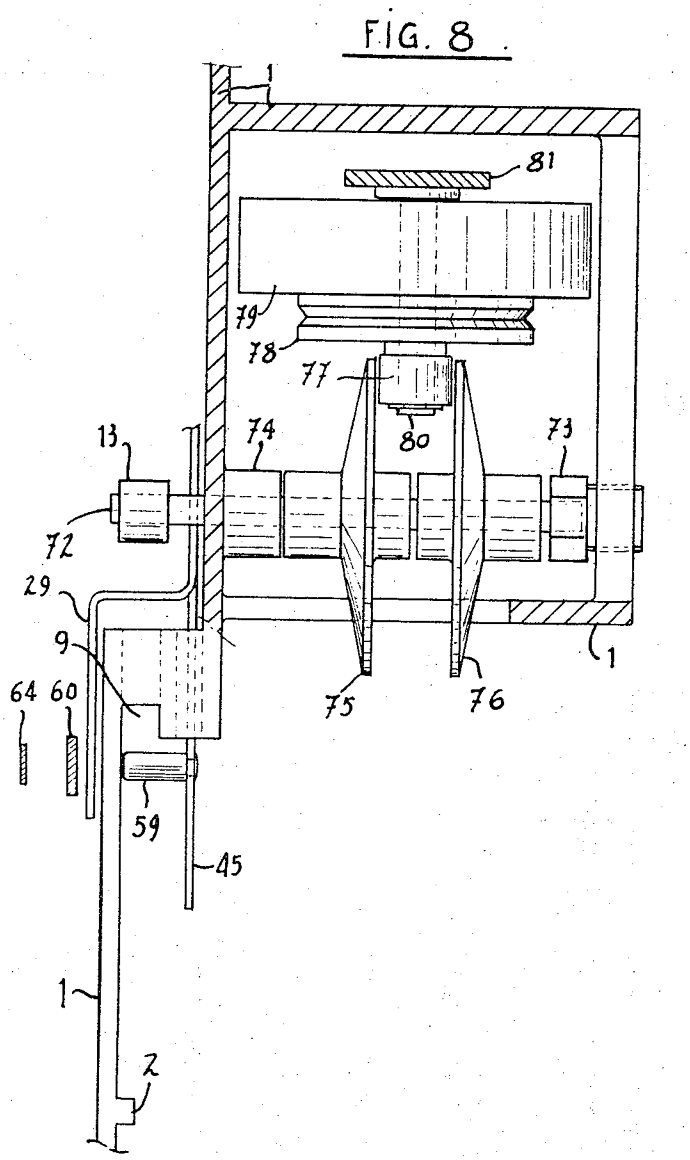
FIG. 8 is a section taken along the line VIII—VIII of FIG. 7.

To bring the cassette 4 into the playback or record position, shown in FIGS. 1 and 2, it is slid along the tongue 2 and guided into a groove 9 formed in the frame 1 and which can be seen in FIG. 8. Secured to the top part of the frame or chassis 1 is a magazine 10 formed with a circular hollow interior 11 of substantially the same dimensions as the hollow interior 6 of the cassette 4 and having a passage 12 arranged in the same way as the passage 8 in the cassette 4. The magazine 10 is so arranged and placed that, when the cassette 4 is in the position for playback or recording, the passages 8, 12 are aligned with or in extension of one another, as shown in FIG. 2. A tape-driving roller 13 fitted to a spindle 72, visible in FIG. 8 and adapted to rotate in the frame 1, is disposed between the magazine 10 and the cassette 4 when the same is in its operative position. The roller 13 is disposed between two playback or recording heads 14, 15 whose playback surfaces are aligned with one another in the same plane as the passage 12. Detector elements are provided between the head 14 and the roller 13 and between the head 15 and the passage 8. In the embodiment shown, the detector elements are photoelectric cells 16, 17 which co-operate with lamps 18, 19 respectively so disposed that a cell can be energised only if, with the associated lamp alight, the tape is not an obstacle between such lamp and its associated cell.

Figure 33:
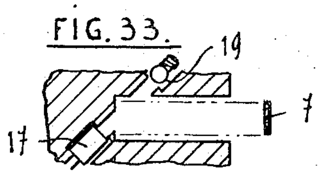

As can be seen in FIG. 33, the cell 17 and lamp 19 are disposed in positions at the ends of a horizontal axis which is at an inclination to the path of the tape 7 in order to leave a completely free passage for the tape leader when the cassette is moved into and out of its operative position.

Co-operating with the roller 13 is a roller 20 freely rotatable on a spindle 20[1] fitted to the end of a lever 21 pivoted at its other end to a spindle 22 disposed near the top of the frame 1 and borne by a lever 23 pivoted to a spindle 24 secured to the frame 1. The spindle 22 co-operates with a fork 25 formed at the end of a lever 26 pivoted around a spindle 27 secured to the frame 1. Also pivoted to the spindle 27 is a lever 28 having at its bottom end a cranked part 29 formed with a protuberance 30 to be described hereinafter and visible in FIGS. 1, 10, 11 and 12. At the top the lever 28 has a bent part 31 bearing an abutment 32 adapted to bear against the lever 26. A spring 33 connected to the lever 28 at a place 34 is connected to a spindle 35 which is rigidly secured to the lever 21 and which bears a roller 36 movable in a slot 37 in the frame 1. Also secured to the spindle 35 is another spring 38 connected at its other end to a rod 39 secured to the top of the frame 1.

The lever 28 bears a pin or the like 40 engaged by a cam or the like 41 formed by one arm 42 of a double-armed lever which is pivoted to a place 44 and whose other arm 43 bears a pivot pin 46 rigidly secured to a soft-iron plate 47 resting on a guide 48 rigidly secured to the frame 1. An armature 50 of an electromagnet 51 (stop relay) also secured to the frame 1 (FIG. 1) is adapted to co-operate with the plate 47. At its top end the lever 45 is articulated to a spindle 52 rigidly secured to the frame 1 and has a bent part 53 to whose end a spring 54 is secured, the same having its other end connected to the lever 42. The lever 45 is maintained in the normal position shown in FIG. 1 by a spring 55 which is secured to a part 56 of the lever 45 and to a place 57 of the frame 1. At the bottom the lever 45 has a projection 58 formed with an abutment 59 which the cassette 4 operates when placed into its operative position, as will be described hereinafter.

Figures 11, 12, 13:
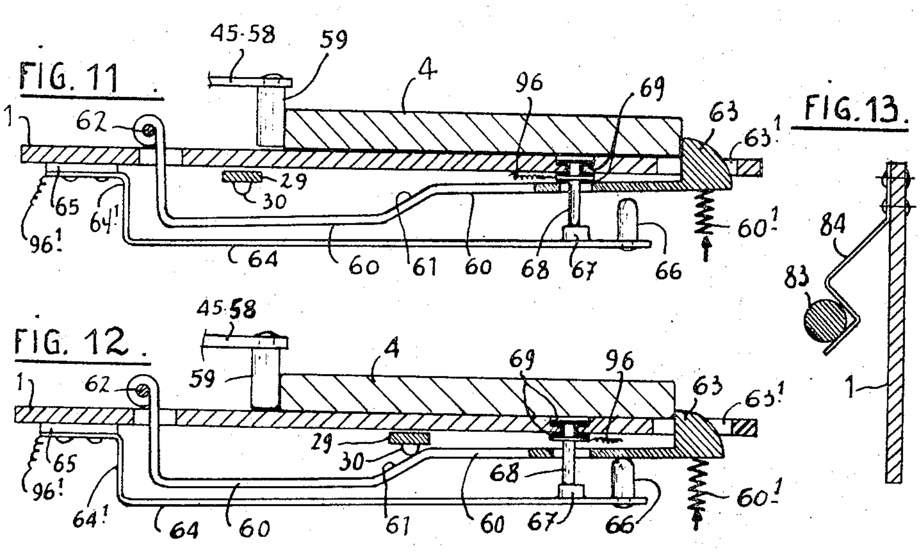
FIGS. 10–12 are elevation views showing the cassette-retaining means in various positions.
FIG. 13 is a section along the line XIII—XIII of FIG. 7.
Figure 10:
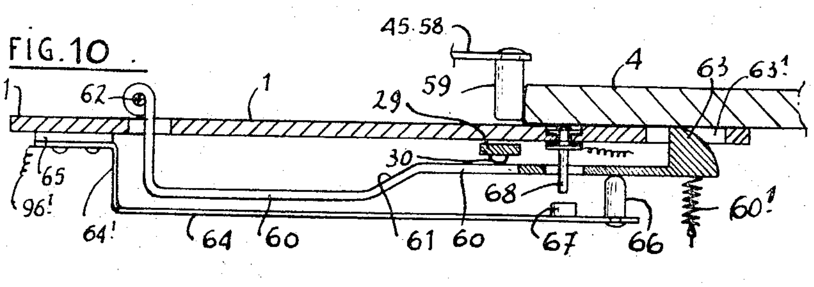
Figure 14:
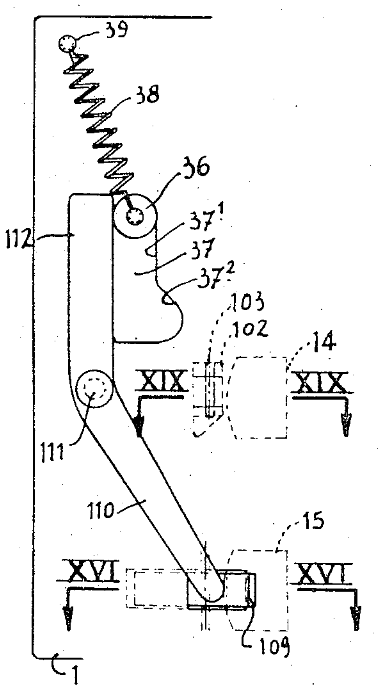
FIGS. 14–19 are diagrammatic illustrations showing means for maintaining the tape in engagement with the recording and playback heads.

The cassette-retaining means are shown in FIGS. 10–12. They comprise a lever 60 having an inclined portion 61 substantially at its centre and bent at one end towards a pivot pin 62, which said bent end engages, mounted on the frame 1; at its other end the lever 60 is urged by a spring 60[1] and has a cassette-retaining cam or the like 63 which engages in an aperture 63[1] in the frame or chassis 1. In front of the lever 60 is a spring strip 64 having at one end a part 64[1], co-operating with an insulating strip 65, by which the strip is secured to the frame; at its other end the spring strip 64 has a tappet 66 adapted to abut the lever 60, and the strip 64 has, near the tappet 66, a contact 67 co-operating with a conductive rod 68 which is insulated from the frame 1 by washers 69 and to which an electric conductor 96 is connected, another electric conductor 96[1] being connected to the strip part 64[1].

Figure 7:
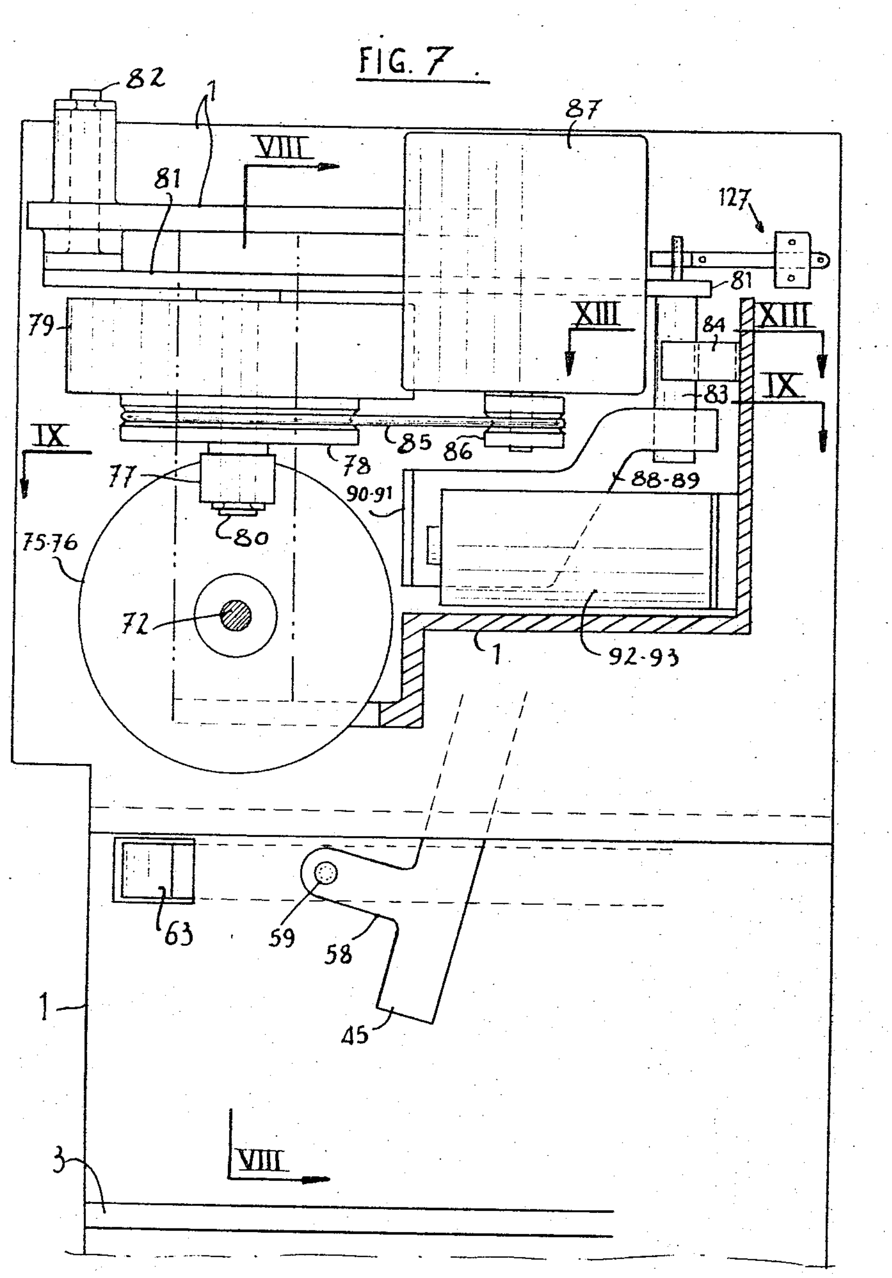
FIG. 7 is a plan view showing the transmission means through which a single motor effects the various tape movements.
Figure 9:
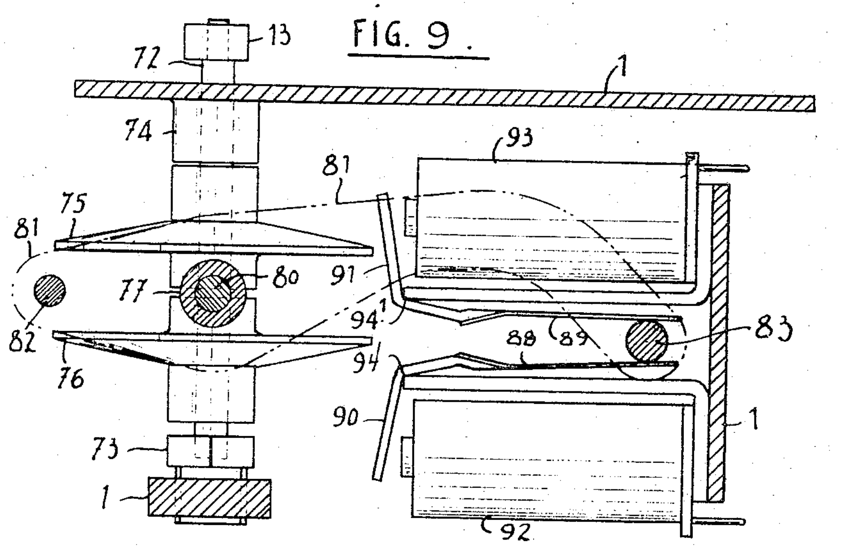
FIG. 9 is a section taken along the line IX—IX of FIG. 7.

The shaft 72 bearing the roller 13 rotates in a bearing 73 and in a sleeve 74 (FIGS. 8 and 9) rigidly connected to the frame 1 and bears two drive plates or discs 75, 76 selectively engageable with a roller 77 rigidly secured to a grooved pulley 78 and a flywheel 79 rotating on a spindle 80 (FIG. 8) borne by a lever 81 articulated at a place 82 (FIG. 9); at its outer end the lever 81 has a rod or pin 83 maintained by a spring strip 84 visible in FIGS. 7 and 13. A belt 85 (FIG. 7) running over the pulley 78 is driven by a pulley 86 rigidly connected to the shaft of a motor 87 connected to the frame 1, as can be seen in FIG. 7. The rod or pin or the like 83 is urged by flexible strips 88, 89 (FIG. 9) rigidly connected to armatures 90, 91 which pivot at places 94, 94[1] and which form part of electromagnets 92, 93 forming the relays controlling the tape unwinding and tape rewinding.

Figure 20:
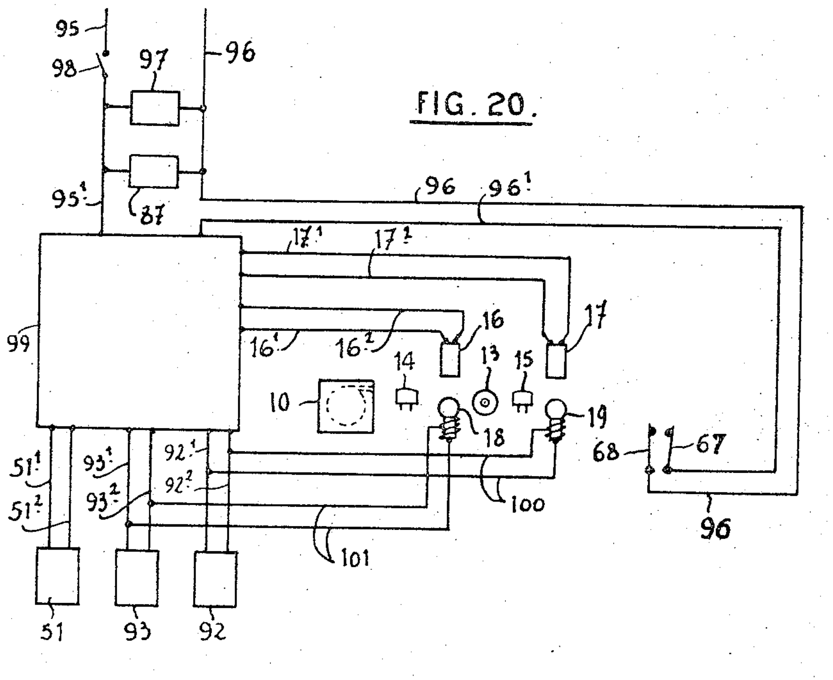
FIG. 20 is a schematic view of the general circuit diagram for the system.

FIG. 20 shows the circuit diagram, with the current supplying wiring 95, 96, the motor 87, an amplifier 97, a main switch 98, and an electronic switch 99 of the Schmitt-trigger and bistable multivibrator type. These circuit diagrams were published in the March 1962 issue of "Radio-Revue," chapter on "Circuits Industriels à Transistors" by Werner Taeger, pages 151 and 152 (Editions Techniques SPRL P.H. Brans-Anvers). The conductor 96 is connected to the electronic switch 99 via contacts 67, 68. The electromagnet 51 forming the stop relay is connected to the electronic switch 99 by wires 51[1], 51[2]; the electromagnets 92, 93 forming the relays controlling unwinding and rewinding are connected to the electronic switch 99 by wires 92[1], 92[2] and 93[1], 93[2], respectively.

Wires 100 extending to the lamp 19 are connected to the wires 92[1], 92[2], and wires 101 extending to the lamp 18 are connected to the wires 93[1], 93[2]; the electronic switch 99 also has connected to it wires 16[1], 16[2] extending to the photoelectric cell 16 and wires 17[1], 17[2] extending to the photoelectric cell 17. Also shown in the circuit diagram are the magazine 10, the recording to reproducing heads 14, 15, and the driving roller 13.

Figure 37:
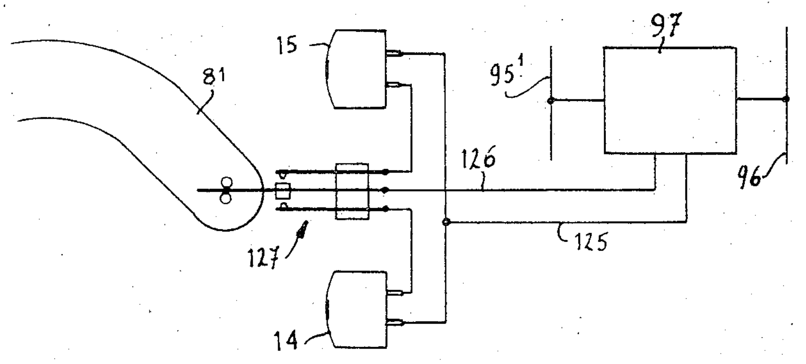
FIGS. 37–39 are diagrammatic illustrations of the means for changing over the circuit of the recording and playback heads.

The amplifier 97 is connected to the heads 14, 15 (FIGS. 37–39) by conductors 125, 126, the conductor 126 being connected to the heads by way of a change-over switch 127 controlled by the lever 81 (FIG. 37).

Figure 19:
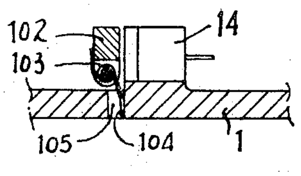

As can be seen in FIG. 19, to keep the tape in engagement with the head 14, a rubbing device 102 is provided which is pivoted around a vertical spindle 103 and urged by a spring 104 engaging in an aperture 105 in the frame 1 so as to press the tape lightly against the playback head 14. Disposed near the head 15 is a rubbing device 106 which is shown in FIGS. 14–18 and which can tilt around a vertical spindle 107 and which, when in the normal position, is, as shown in FIG. 16 retracted into an aperture 108 in the frame 1; the device 106 has a tailpiece 109 cooperating with the end of a double-armed lever 110, 112 which can pivot around a spindle 111 and whose arm 112 is operated by the roller 36. In the position shown in FIGS. 14 and 16, the end of the lever 110 keeps the device 106 retracted.

Figure 15:
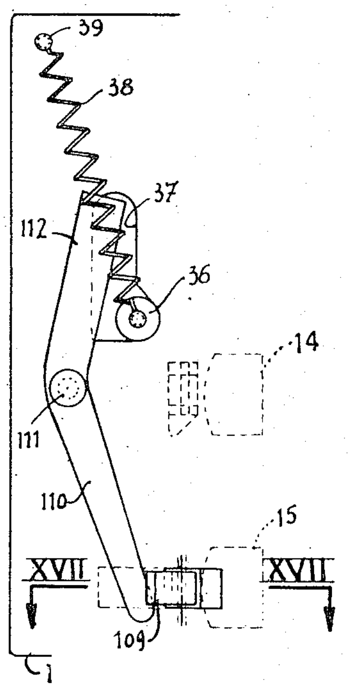
Figure 16:
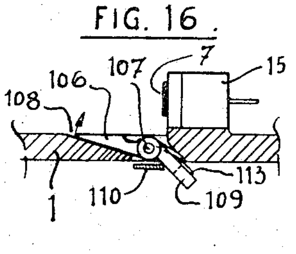
Figure 17:
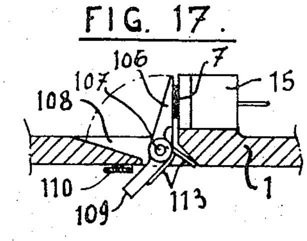

When the cassette 4 is introduced as shown in FIG. 2, the roller 36 rigidly connected to the lever 31 comes into the position shown in FIGS. 2 and 15 and frees the lever 110, 112 so that the spring 113 moves the device 106 into the position shown in FIG. 17 to press the tape 7 lightly against the playback head 15.

Figure 18:
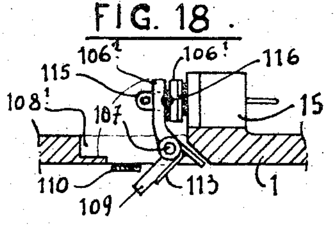
Figure 18A:
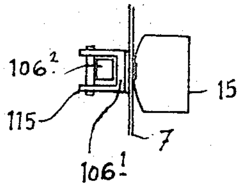
Figure 36:
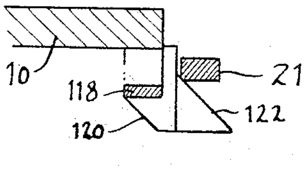
FIG. 36 is a sectional view taken along line XXXVI—XXXVI in FIG. 34.

In a variant, which can be seen in FIGS. 18 and 18A, the rubbing device is formed by two elements, one, 106[1], of which may or may not have a felt 114 engaging with the tape and comprises a fork 115 engageable on the element 106[2] and can pivot around a needle 116 so as to take up a position parallel with the plane of the playback head.

Figure 21:
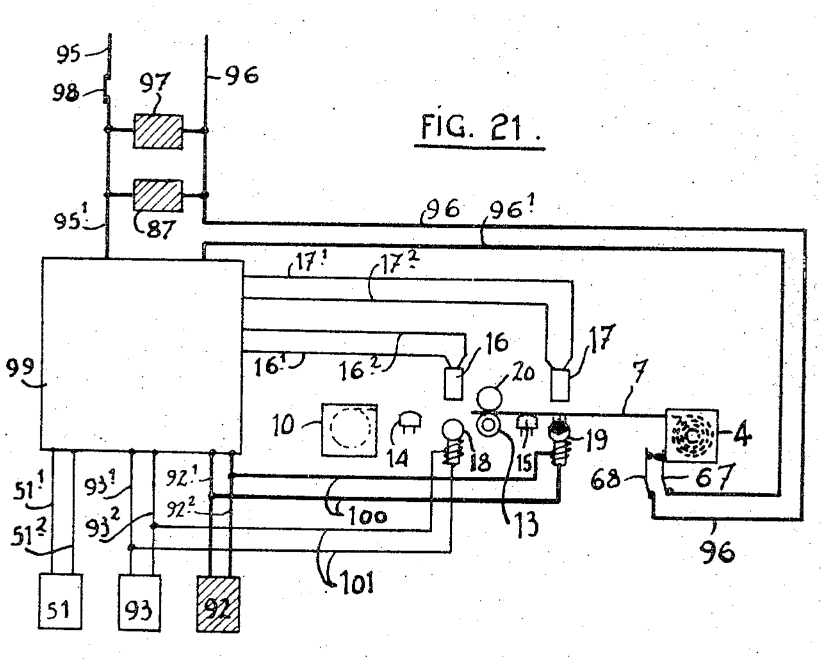
FIGS. 21–27 are schematic illustrations of various phases of the circuit in the operation of the device.
Figure 22:
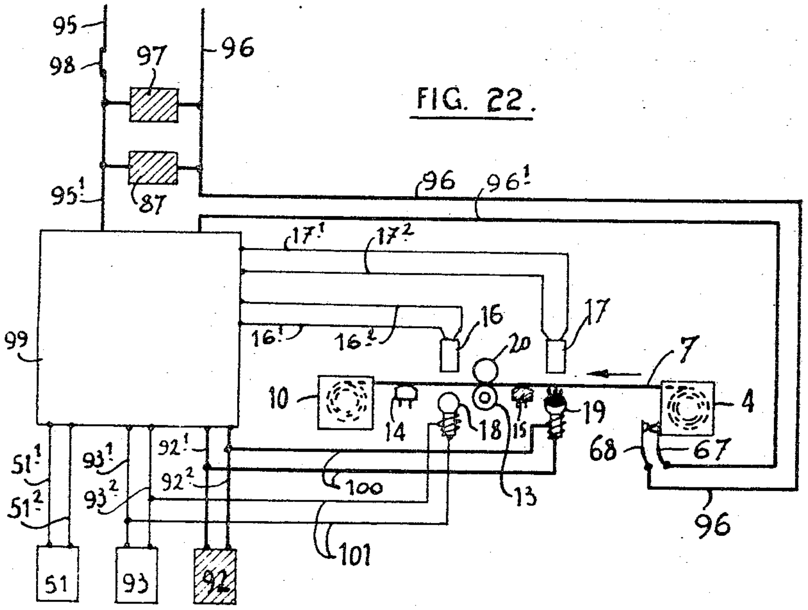
Figure 38:
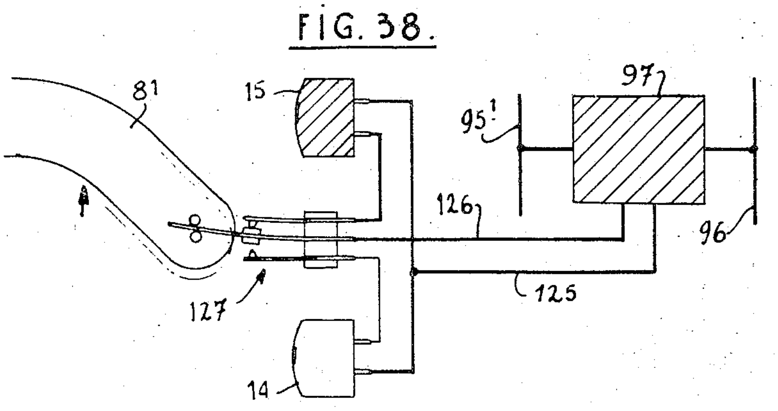

The device operates as follows:

When a cassette 4 is slid into the operative position along the tongue 2 and into the guide 9, the cassette operates the abutment 59 of the lever 45. The lever 45 pivots around the spindle 52 and, by way of the cam 41, drives the lever 28 so that the foot 32 pivots the lever 26 downwards and the same acts by way of its fork 25 on the lever 23. The lever 21 therefore descends, guided by the roller 36 which moves first in the vertical part 37[1] of the slot 37 but subsequently—and loaded by the spring 33—follows the inclined part 37[2] of the slot 37, whereas the lever 21 pivots around the spindle 22 so that the roller 20 moves towards the driving roller 13 and grips the end of the tape 7 between the rollers 13 and 20 (FIG. 2). During these various movements, the protuberance 30 of the lever 28, 29 slides below the levers 60 from the position shown in FIG. 10 into the position shown in FIG. 11, so that the lever 60 is released. The spring 60[1] can now pivot the lever 60 once the cassette 4 has reached the end of its travel so that the cam 63 of the lever 60 takes up a position behind the cassette (FIG. 11) so that the contacts 67, 68 close on to each other (FIGS. 2, 11 and 21). Previously, the main switch 98 has been closed and the motor 87 switched on so that it is rotating (FIG. 21). Closure of the interlock contact system 67, 68 starts the electronic switch 99. The unwinding relay 92 therefore picks up and the lamp 19 lights; also, the armature 90 is attracted by the relay 92 (FIG. 9) and pivots around its pivot 94, and the flexible strip 88 thrusts the rod or pin 83 of the lever 81 bearing the spindle 80 around which the flywheel 79, pulley 78 and roller 77 rotate, so that the latter is engaged with the disc 75. Since the shaft 72 is rigidly secured to the roller 13, the latter is rotated. Simultaneously, the lever 81 acts on the changeover switch 127 to close the circuit of the head 15 which is operative for the or each track required for the outward movement of the tape (FIG. 38). The tape 7 is therefore driven and is stored in the space 11 inside the magazine 10, and the first track is therefore recorded or played back (FIGS. 2 and 21, 3 and 22). While the tape is being stored in the magazine 10, the lamp 19 does not affect the cell 17 since the tape is present between them.

Figure 4:
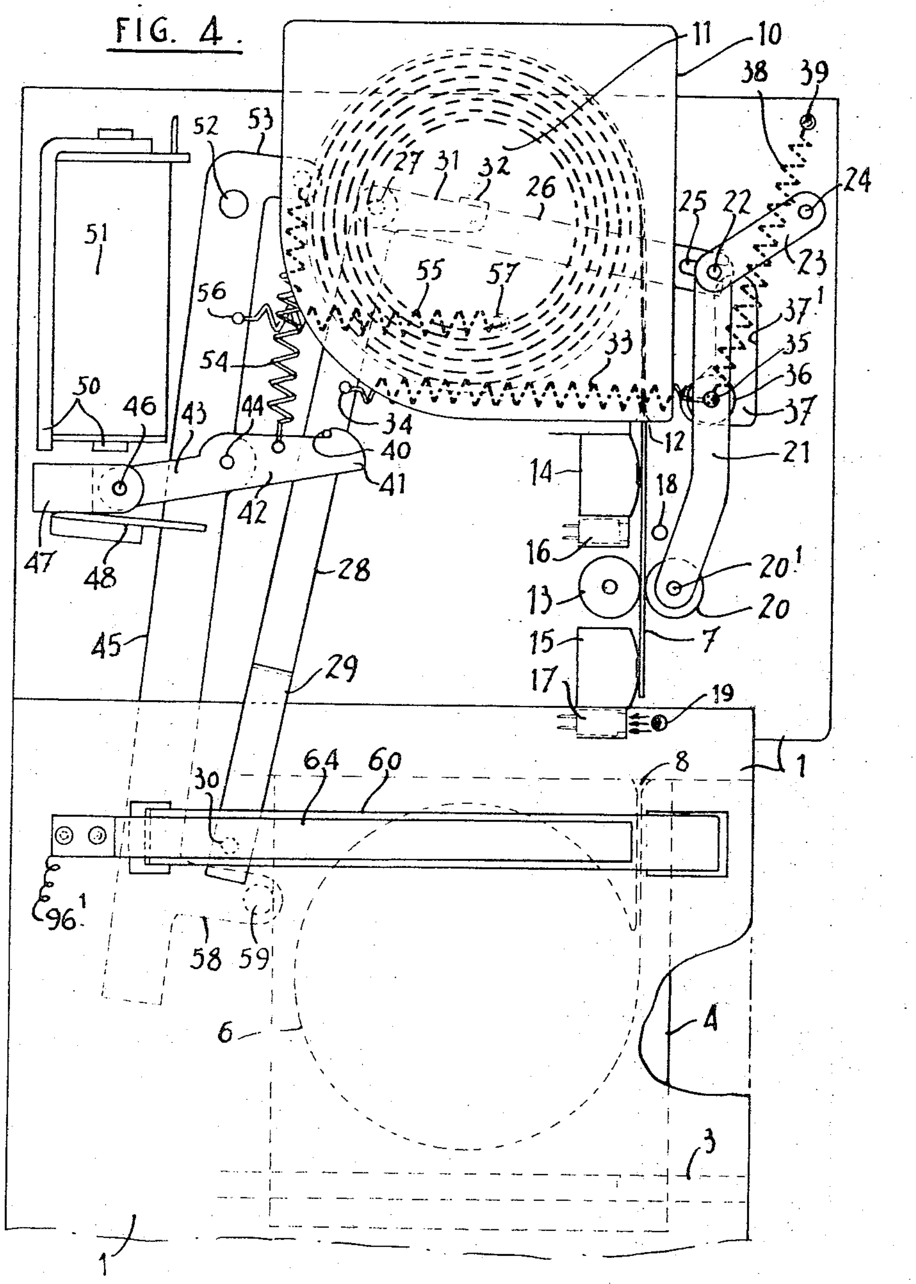
Figure 23:
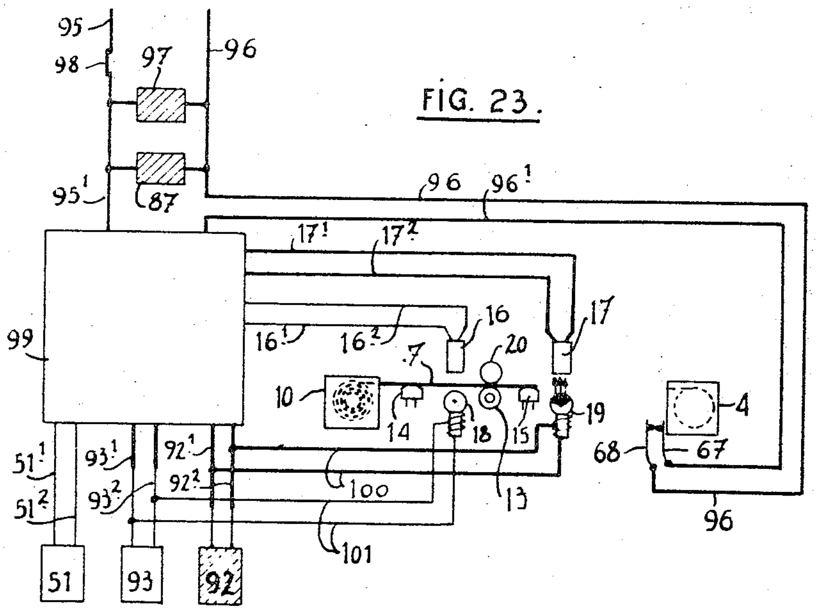
Figure 24:
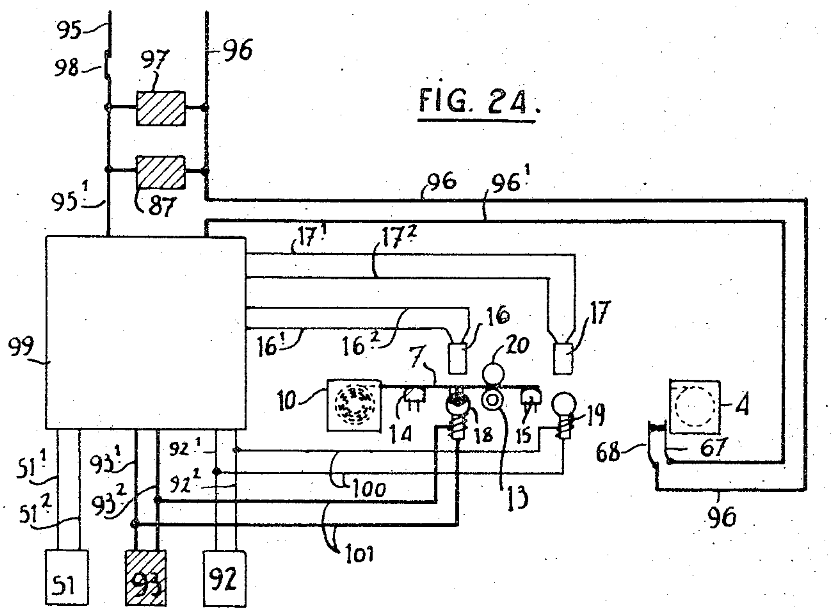
Figure 39:
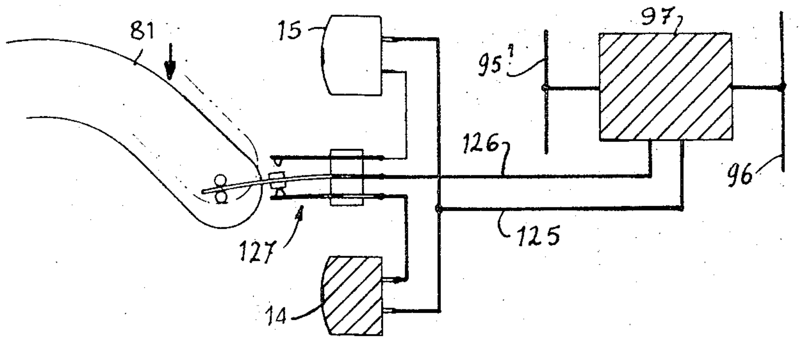

When all the tape 7 is in the position shown in FIG. 4—that is, beyond the detector element 19, 17—the lamp 19 energises the cell 17 which, by way of the wires $\mathbf{17^1}$, $\mathbf{17^2}$ (FIG. 23), acts on the electronic switch 99, so that the lamp 19 goes out and the unwinding relay 92 drops. Simultaneously, the lamp 18 lights and the rewinding relay 93 picks up (FIG. 24). The moving armature 91 of the relay 93 is attracted (FIG. 9) and pivots around its pivot $\mathbf{94^1}$, and the strip 89 thrusts the rod 83 of the lever 81. The roller 77 is therefore engaged with the disc 76 so that the shaft 72 and roller 13 now rotate to the opposite hand. Simultaneously, the lever 81 acts on the changeover switch 127 which opens the circuit of the head 15 and closes the circuit of the head 14 (FIG. 39). The tape 7 departs from the magazine 10 and returns into the cassette 4.

Figure 5:
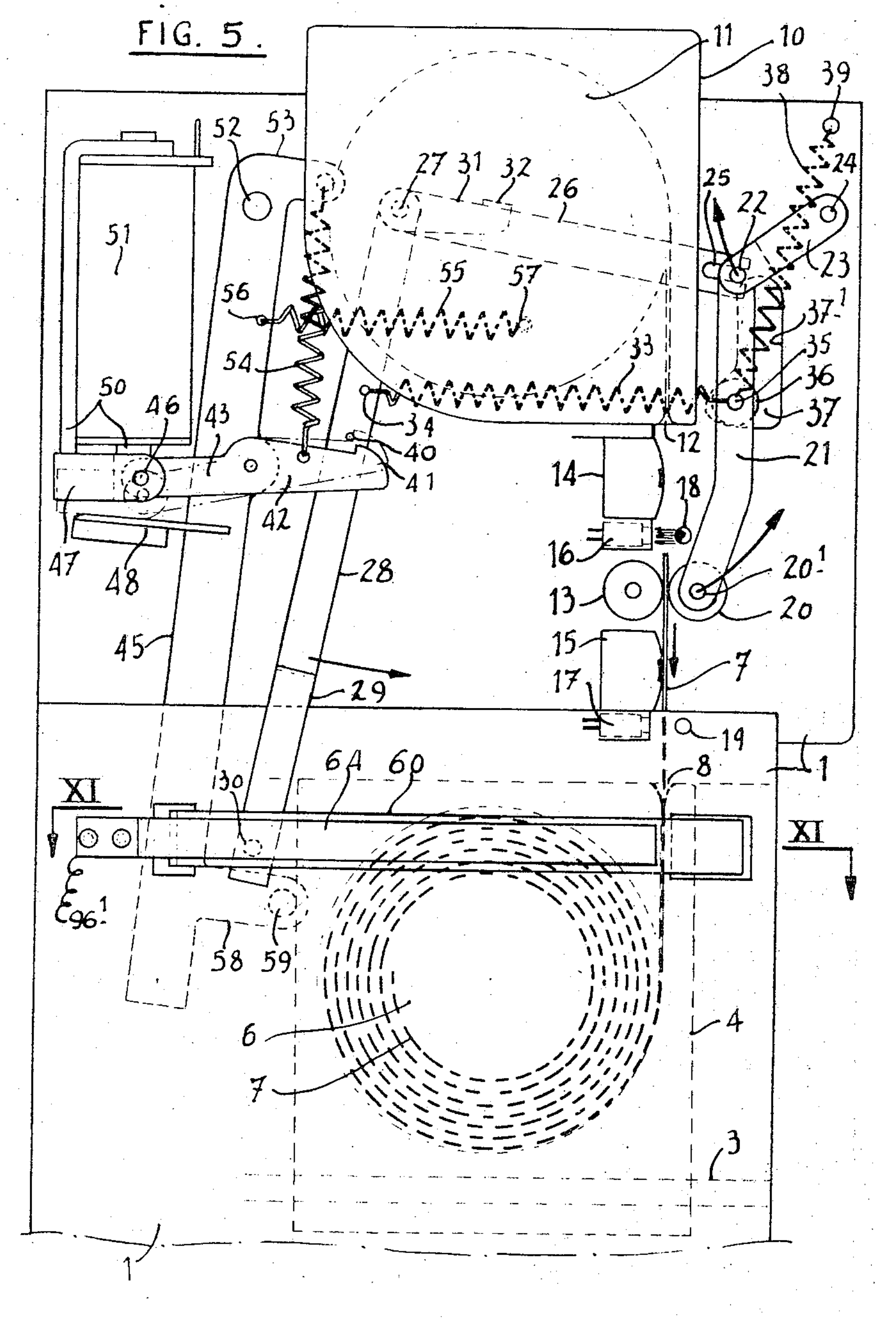
Figure 6:
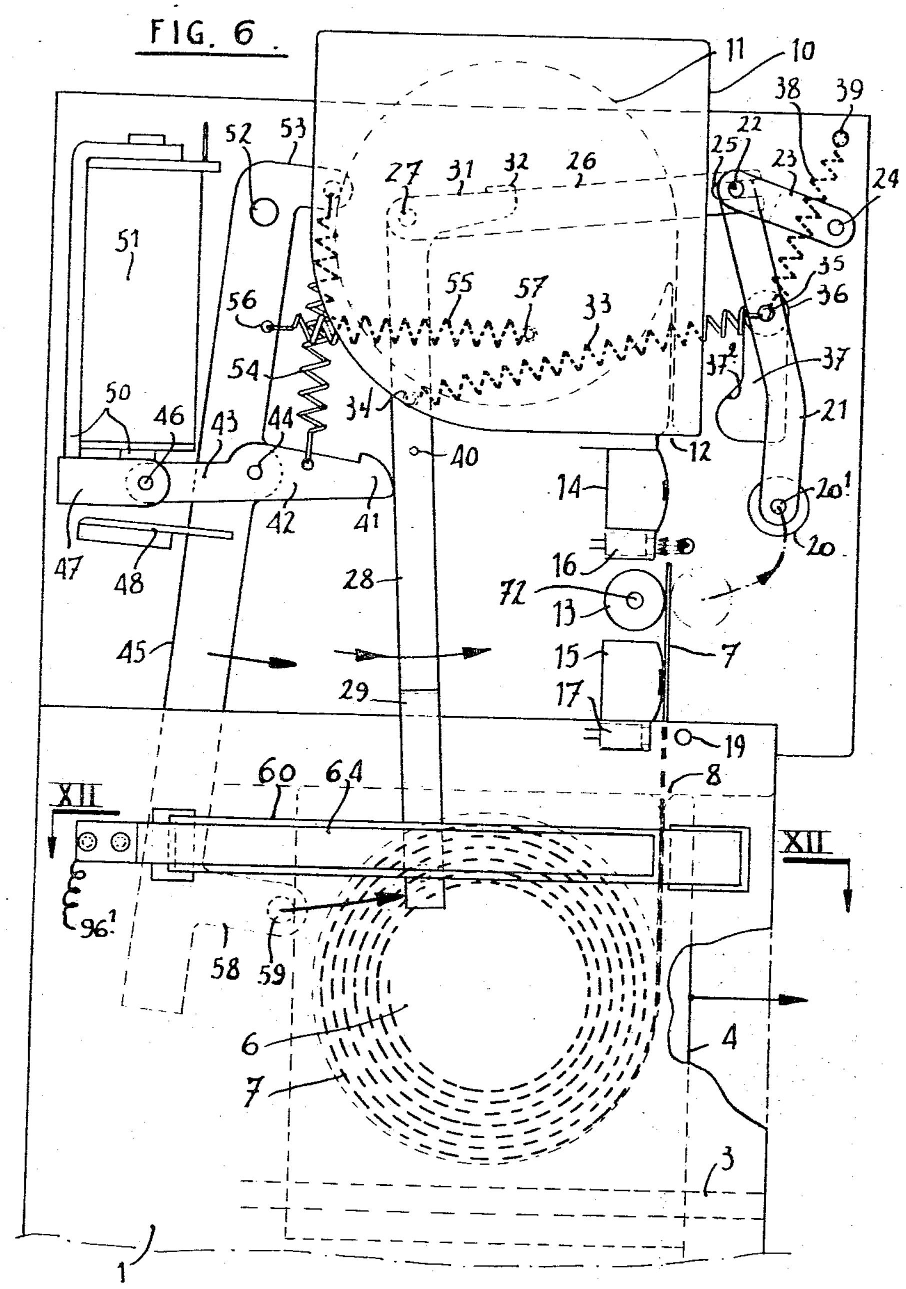
Figure 25:
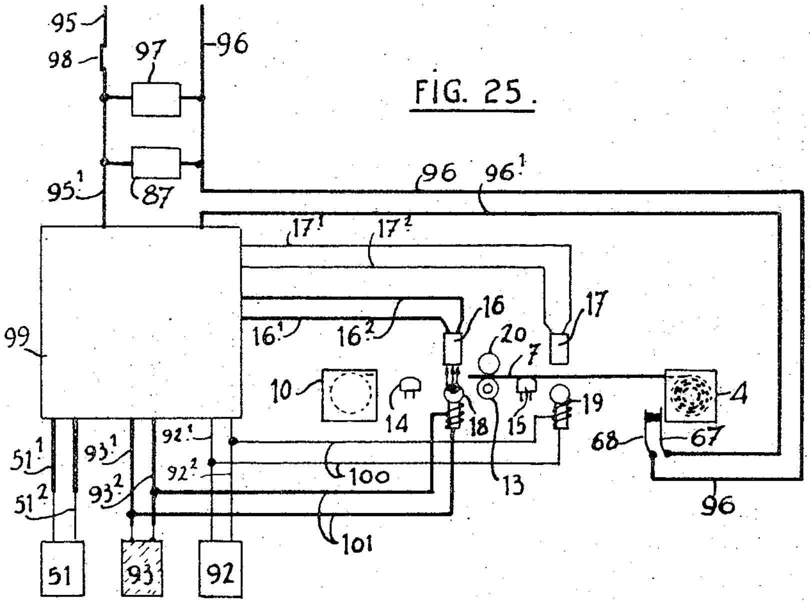
Figure 26:
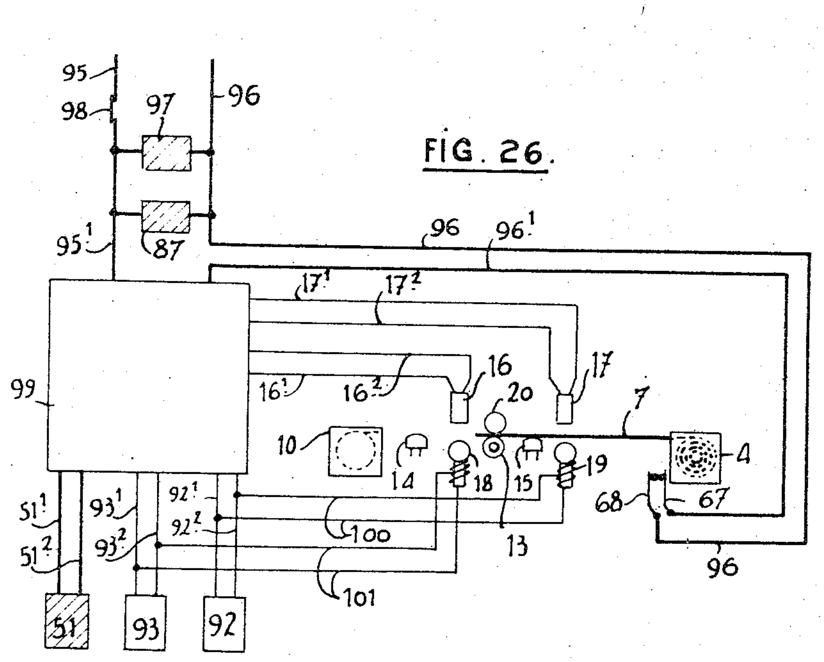
Figure 27:
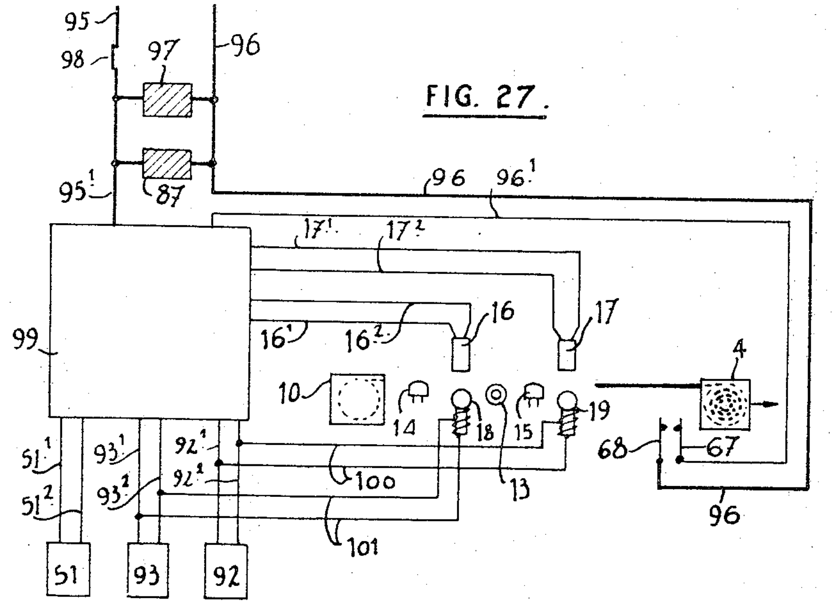

At the end of re-entry into the cassette, the starting end of the tape 7 uncovers the lamp 18 (FIGS. 5, 25) so that the cell 16 is energised and causes the electronic switch 99 to extinguish the lamp 18, de-energise the rewinding relay 93 and energise the stop relay 51. The relay 51 attracts the plate 47, so that the lever 42, 43 tilts, the pin 40 disengages from the cam 41, and therefore the lever 28 (FIGS. 6 and 26) releases, to be returned by the spring 33 to the normal position by way of the positions shown in FIGS. 11, 12 and 10; during this movement the protuberance 30 rubs against and acts on the inclined portion 61 of the lever 60 which is forced back and disengages the cassette-retaining cam 63 to release the cassette. In its return movement the lever 60 acts on the tappet 66 so that the interlock device 67, 68 opens and switches off the electronic switch 99 (FIGS. 10 and 27). The relay 51 drops, the lever 45 releases and is returned by the spring 55 to its normal position, thrusting, as it does so, and by way of the abutment 59, the cassette 4 (FIG. 1).

Figure 35:
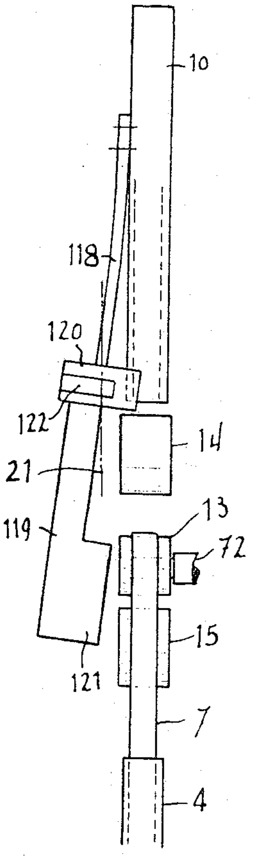
FIGS. 34 and 35 are diagrammatic illustrations of the means to prevent the tape from jamming in another position thereof.
Figure 34:
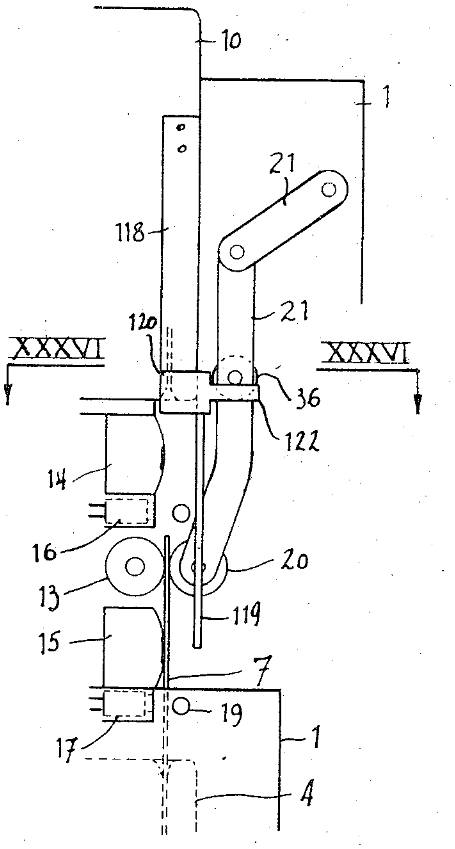
Figure 29:
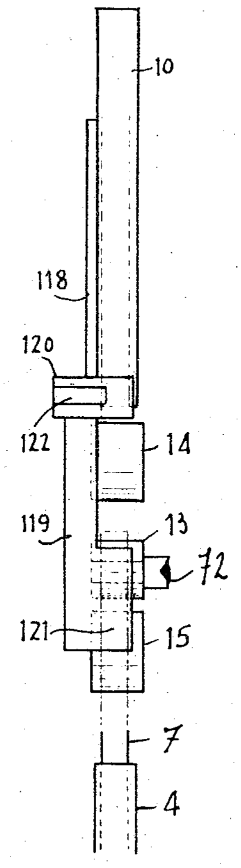
FIGS. 28 and 29 are diagrammatic illustrations of means to prevent the tape from jamming.
Figure 28:
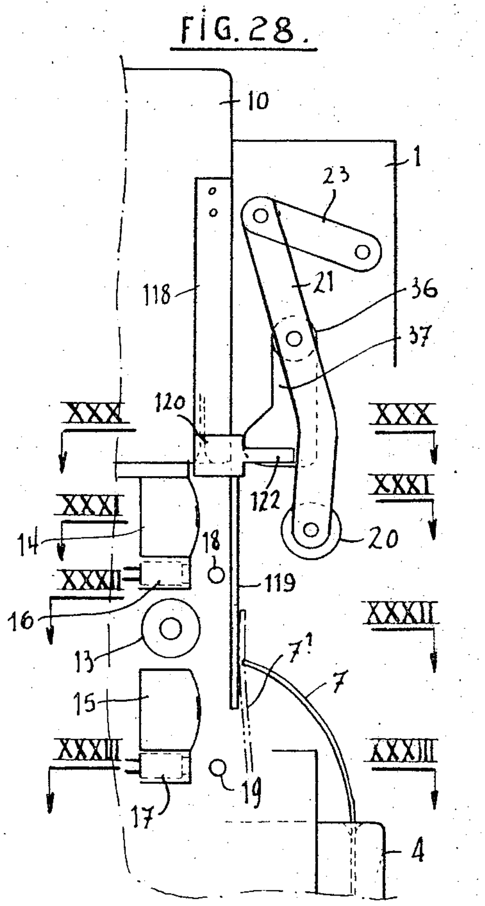
Figure 31:
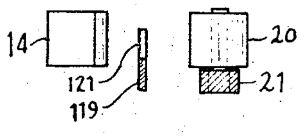
FIGS. 30 to 33 are sectional views taken along respective section lines XXX—XXX to XXXIII—XXXIII in FIG. 28.
Figure 30:
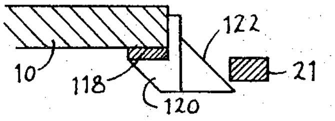
Figure 32:
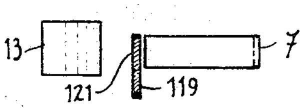

In order that, when the cassette is introduced, the leader or starting end of the tape 7 may not jam, for instance, between the roller 13 and the head 15, a safety or interlock member is secured to the frame 1, as can be seen in FIGS. 28 and 29. This member is in the form of two strips 118, 119 which are disposed in extension of one another in planes staggered by 90° to one another and are interconnected by a block 120; the bottom strip 119 ends in an abutment 121 which, upon meeting the starting end of the tape, forces the latter into the position $\mathbf{7^1}$ visible in FIG. 28. The block 120 is formed with an inclined portion 122 which so acts that, when the lever 21 moves from the position shown in FIG. 1 into the position shown in FIG. 2 (FIGS. 28 and 34), the strip 118, 119 is moved into the position shown in FIG. 35 by the thrust of the lever 21 on the inclined portion 122 to allow the starting end of the tape 7 to pass by.

The element 118, 119 returns to its normal position shown in FIG. 29 when the cassette 4 is withdrawn and when the lever 21 returns to the position shown in FIG. 28 (or FIG. 1).

What I claim is:

1. In a device for unwinding and rewinding a sound-recording tape of predetermined length from and into a moving cassette for recording or reproduction, the tape being in substantially the same position in the cassette at the end of operation as at the beginning thereof, recording or reproducing being effected half in the direction of tape unwinding and half in the rewinding direction, the device comprising tape-driving means, recording and reproducing heads and elements for detecting the presence of the tape disposed between, on the one hand, the position taken up by the moving cassette in the operative position for recording or reproducing, and, on the other hand, a stationary magazine where the tape is stored during operations, such elements controlling the reversal or the direction of tape movement or the stoppage thereof, the said sound-recording tape driving means being a driving roller, the reproducing and recording heads being disposed one each on either side of said driving roller detector elements and lamps cooperating with said detector elements and so disposed that the latter can be operated only if, the corresponding lamp is lit, and the sound-recording tape does not form an obstacle between such lamp and such element, the arrangement being such that when the cassette is in the operative position the driving roller is between the stationary magazine and the cassette and is disposed between the two reproducing or recording heads whose reproducing faces are aligned with each other in the same plane, and the detecting elements are respectively disposed between the driving roller and the head nearer the stationary magazine and between the other head and the cassette.

2. Device according to claim 1, wherein the plane in which the reproducing faces of the reproducing or recording heads are disposed is substantially the plane containing the outer ends of the tape entry and exit passages in the stationary magazine and in the cassette.

3. A device according to claim 1, comprising a second roller cooperating with the tape-driving roller, a pivotable first lever supporting said second roller, a second lever with a spindle on which said first lever is pivotally mounted, and a stop operated by the moving cassette when it is introduced, the mechanical connection being such that, when the cassette operates the stop the first lever bearing the second roller simultaneously descends and pivots to move the second roller towards the tape-driving roller, the tape being gripped between the said rollers.

4. A device according to claim 3, comprising a guide roller on said first lever, a third lever acting on the retaining device, a frame having a slot in which the guide roller is movable, a spindle on said first lever supporting said guide roller, a spring secured to the latter spindle and connected to said third lever, the slot having a vertical portion and an inclined portion with a shape such that the spring can move the second roller towards the tape-driving roller to clamp the end of the tape.

5. A device according to claim 3, wherein the means for retaining the moving cassette comprises a fourth lever, a frame pivotally supporting the fourth lever, a cassette-retaining cam on said fourth lever engageable in an aperture provided in the frame, and a third lever forming part of a linkage with the first lever for operating said fourth lever.

6. A device according to claim 5, comprising a fifth lever pivotably supported on the frame and including a forked end portion, said spindle supporting the first lever being in engagement with said forked end portion of the fifth lever, the third lever being also provided on the latter spindle.

7. A device according to claim 3, comprising a spring loaded rubbing device for urging the tape into contact with the head disposed between the driving roller and the magazine.

8. A device according to claim 3, comprising a spring loaded rubbing device for urging the tape into contact with the head disposed between the moving cassette and the driving roller, and a lever coupled to said first lever for retracting said rubbing device and retaining the same in retracted position in dependence upon the normal position of the first lever.

9. A device according to claim 8, wherein said rubbing device includes first and second elements, one of which is pivotable and includes a fork engaging the other element as to assume a position parallel with the reproducing plane of the head.

10. A device according to claim 3, comprising a safety member which retracts when the tape is gripped between the tape-driving roller and the second roller and which automatically returns to a normal position when the second roller is moved to its normal position upon removal of the cassette, to prevent the leader end portion of the tape from being jammed between the tape-driving roller and the head disposed after the cassette when the latter is brought into the operative position.

11. A device according to claim 1, comprising a shaft supporting the tape-driving roller, two drive plates mounted on said shaft, a driven roller between said plates, a pivotable sixth lever supporting said third roller, flexible strips acting on said sixth lever, moving armatures of electromagnets supporting said flexible strips so that, when none of the electromagnets is energized, the third roller engages neither of the drive plates, said third roller being selectively engaged with the discs by the selective energization of the electromagnets, to drive the tape in either direction.

12. A device according to claim 5, comprising a seventh lever bearing an abutment and operated by the moving cassette upon its introduction, and means for enabling the third lever to be driven by the seventh lever comprising a spindle on the third lever, and a cam engageable with said spindle and formed by one arm of a double-armed lever pivotably connected to the seventh lever.

13. A device according to claim 5, comprising an electromagnet including an armature, a plate connected to said third lever and cooperating with armature to form an end-of-operation relay controlling the release of the cassette.

14. A device according to claim 5, wherein the fourth lever permits closure of the circuit controlling the main drive circuit only when said cam thereon engages behind the cassette when the same has reached its operative position and is thereby retained by the said cam.

15. A device according to claim 5, comprising an element for causing the tape to cooperate with the driving elements, said fourth lever assuming a position in which its cam releases the cassette only after said element for causing the tape to cooperate with the driving elements is in a position corresponding to an inoperative position of the said driving elements.

16. A device according to claim 11, comprising a current supply, a motor, an amplifier, a main switch, an electronic switch of the Schmitt-trigger and bistable multivibrator type, relays associated with the end of tape operation, the outward movement of the tape and the return movement of the tape, respectively, conductors respectively connecting each relay to the electronic switch, some of said conductors being connected to lamps of detecting elements controlling tape reversal and the end of tape movement in the return and outward direction, photocells associated with said lamps electrically connected to the electronic switch, and an input conductor connected to the electronic switch and including an interlock device closed by the moving cassette when the same has reached the end of its movement into its operative position.

17. A drive according to claim 16, comprising conductors connecting the amplifier to the recording and reproducing heads, one of which conductors includes a reversing switch operated by the sixth lever.

18. A device according to claim 1, comprising means for retaining the cassette in operative position, and means operated by the positioning movement of the cassette to engage the tape with its driving means, cause the tape to move in either direction until the tape end has passed a predetermined location, then reverse the direction of tape movement, change over the connection of the recording and reproducing heads so as to activate the head corresponding to the track associated with rewinding of the tape into the cassette, cause the tape to be rewound into the cassette until the tape end has passed a predetermined location, then release the cassette, and prepare the device for a new cycle of operations.

19. A device according to claim 18, comprising means for permitting release of the cassette only when the tape has returned substantially to its initial position and the elements for causing the tape to cooperate with the driving means and the recording or reproducing heads are in a position completely clear of the path of the cassette and of the leader end portion of the tape.

References Cited

UNITED STATES PATENTS

| | | | |
|---|---|---|---|
| 2,668,059 | 2/1954 | Roberts ---------- | 242—55.12 |
| 3,190,575 | 6/1965 | Hayner et al. ----- | 242—55.13 |
| 3,220,659 | 11/1965 | Pastor et al. ------ | 242—55.13 |

LEONARD D. CHRISTIAN, *Primary Examiner.*